United States Patent [19]

Lau et al.

[11] Patent Number: 5,521,881
[45] Date of Patent: May 28, 1996

[54] METHOD OF PROCESSING SEISMIC DATA HAVING MULTIPLE REFLECTION NOISE

[75] Inventors: Yiu-Wa A. Lau; Long D. Pham, both of Houston, Tex.

[73] Assignee: Exxon Production Research Company, Houston, Tex.

[21] Appl. No.: 300,474

[22] Filed: Sep. 2, 1994

[51] Int. Cl.$^6$ .................................................. G01V 1/22
[52] U.S. Cl. .................. 367/24; 367/46; 367/52; 364/421
[58] Field of Search .................. 367/24, 46, 52; 364/421

[56] References Cited

U.S. PATENT DOCUMENTS

| | | | |
|---|---|---|---|
| 4,189,704 | 2/1980 | Martin et al. | 367/60 |
| 4,209,854 | 6/1980 | Ruehle | 367/43 |
| 4,319,347 | 3/1982 | Savit | 367/52 |
| 4,468,761 | 8/1984 | Rietsch | 367/43 |
| 4,802,146 | 1/1989 | Moeckel | 367/52 |
| 4,887,243 | 12/1989 | Pann | 367/24 |
| 4,907,205 | 3/1990 | Yanchak | 367/52 |
| 4,922,362 | 5/1990 | Miller et al. | 367/46 |
| 4,937,794 | 6/1990 | Marschall et al. | 367/21 |
| 4,992,993 | 2/1991 | Chambers | 367/21 |
| 5,095,466 | 3/1992 | Julien et al. | 367/24 |
| 5,150,331 | 9/1992 | Harris et al. | 367/50 |
| 5,365,492 | 11/1994 | Dragoset, Jr. | 367/21 |
| 5,404,296 | 4/1995 | Moorhead | 364/421 |

OTHER PUBLICATIONS

Seismic Data Processing, Ozdogan Yilmaz, Published 1987 by Society of Exploration Geophysicists pp. 157–162.

Primary Examiner—Charles T. Jordan
Assistant Examiner—Christopher K. Montgomery
Attorney, Agent, or Firm—J. M. Gilbreth

[57] ABSTRACT

Disclosed is a method of processing seismic data containing multiples, which method generally includes as a step, determining the two-way travel time to a suspected multiple generating event. This method includes the application of a normal moveout operation to the recorded seismic trace utilizing the primary event velocities. Once the normal moveout has been applied to the data, all of the events in the trace are shifted downward in time by an amount of time equal to the two-way travel time to the suspected multiple generating event as previously determined. Once the normal moveout operation and the two-way travel time shift have been applied to the trace, a reverse normal moveout operation is applied to the trace utilizing an extended velocity function, which is a function of the original primary and the velocity within the suspected multiple generating layer. The resulting trace is now a trace containing only multiples. Finally, the multiple noise is subtracted from the original data utilizing an amplitude scaling factor and a residual time shift.

14 Claims, 7 Drawing Sheets

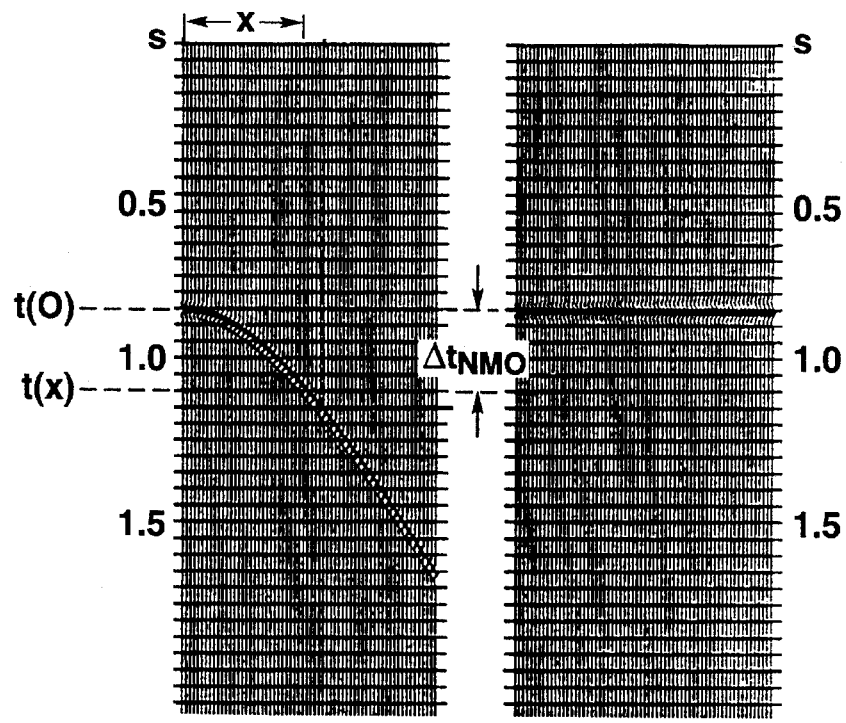
FIG. 5A  FIG. 5B
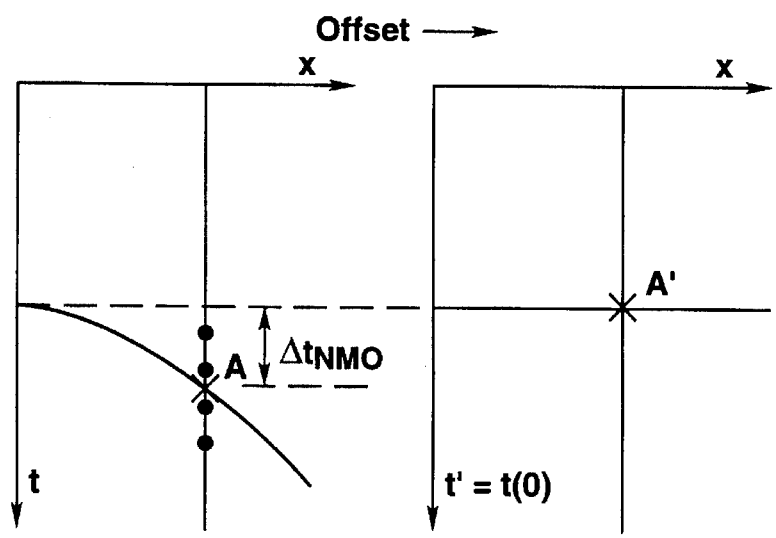
FIG. 6A  FIG. 6B

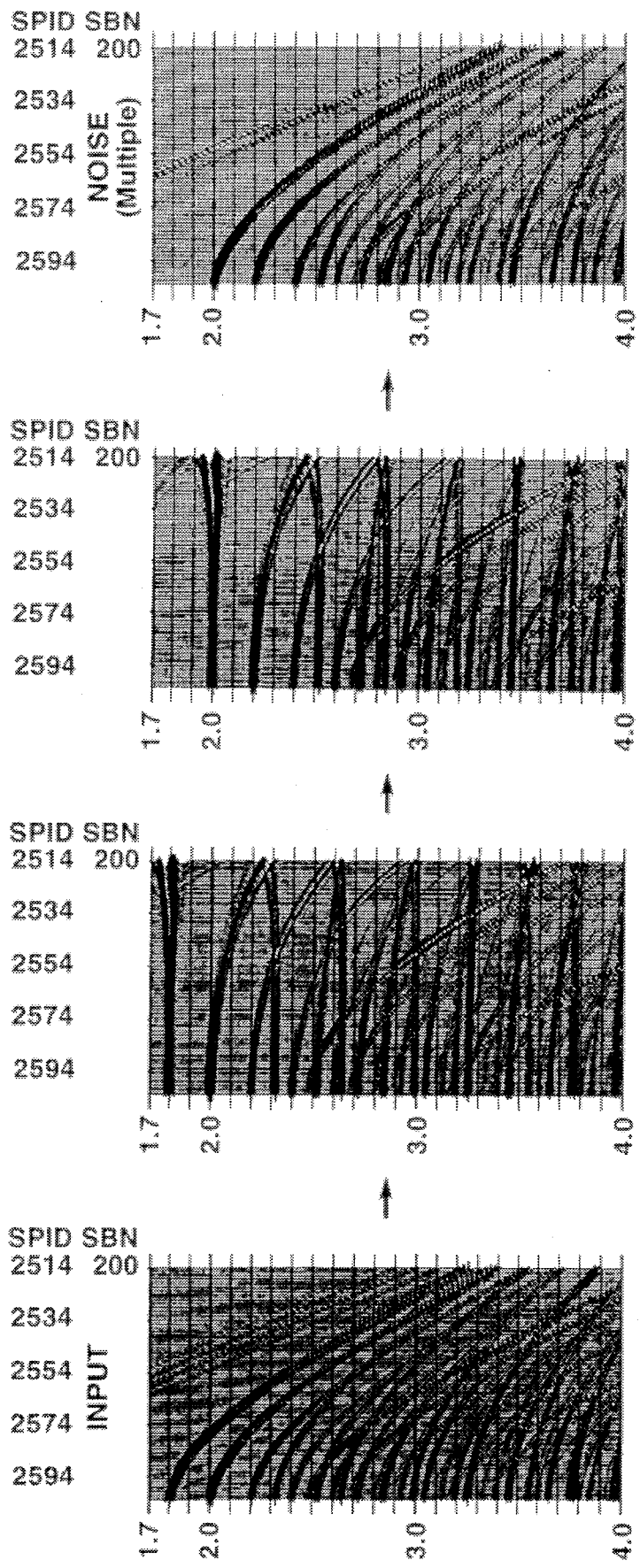

METHOD OF PROCESSING SEISMIC DATA HAVING MULTIPLE REFLECTION NOISE

BACKGROUND OF THE INVENTION

1. Field of the Invention

The present invention relates to a method of processing seismic data. In another aspect, the present invention relates to a method for processing seismic data having multiple reflection noise. In still yet another aspect, the present invention relates to a method for isolating multiple reflection noise in seismic data.

2. Description of the Related Art

Seismic exploration generally involves generating seismic pulses at the surface of the earth by means of one or more seismic sources. The seismic pulses travel downwardly into the earth with a fractional amount being reflected and/or refracted due to differences in elastic properties at the interface of various subterranean formations.

Detectors, such as seismometers, geophones or hydrophones, produce analog electrical seismic signals or seismic trace signals in response to detected seismic wave reflections and/or refractions. The analog electric seismic signals or seismic trace signals from the detectors can then be recorded. Alternatively, the analog seismic signals or seismic trace signals from the detectors can be sampled and digitized prior to being recorded. The seismic data recorded in either manner are subsequently processed and analyzed to determine the nature and structure of the subterranean formations.

From the recorded data, a seismic section is generated. A seismic section is a seismic image depicting the subsurface layering of a section of earth along a seismic line of profile. The seismic section is an important tool which the geologist studies to determine the nature of the earth's subsurface formations. However, before an array of seismic samples can be converted into a seismic section which can be interpreted by the geologist, the seismic data must be processed to reduce the degradation due to noise.

Seismic interpretation generally involves the study of the behavior of arrival times, amplitudes, velocities, frequencies, and character of the reflections from target horizons. Any changing or anomalous behavior is of particular interest.

Multiple reflection energy, commonly known as "multiples", are a well known geophysical phenomenon that are generally defined as seismic energy which has been reflected more than once. Multiples are commonly generated in a layer which is bounded by layers of much different density, for example, water bounded by the water bottom and the water surface. Thus, water bottoms tend to be a common source for multiples, although multiples can occur in land data also.

Generation of water bottom multiples occurs when a portion of a seismic signal travelling through the water is reflected off of the water bottom. This reflected signal then travels within the water layer toward the water surface where it is reflected off of the water surface back toward the water bottom. The reflection between the water bottom and the water surface may occur one or more times. As the seismic receivers merely measure arrival time without regard for travel path, seismic signals which have undergone a tortuous travel path appear deeper in the seismic record than they physically are in the subsurface.

Traditional prior art methods for removing multiples from seismic data, such as predictive deconvolution, generally have utilized, and required, periodicity of the multiples for proper processing. That is, after the first occurrence the multiple would repeat every n milliseconds in the trace. For example, in predictive deconvolution, information from the earlier part of the seismic trace is used to predict and deconvolve the latter part of the trace.

Other traditional art methods, such as normal moveout, require a significant velocity difference between primaries and multiples. For example, to the extent that long-path multiples travel at a lower average velocity than primary reflections for the same arrival time, they will show greater normal moveout and can be attenuated with common-depth-point stacking.

Unfortunately, these very assumptions of periodicity or significant velocity differences tend to limit the application and/or effectiveness of predictive deconvolution or normal moveout techniques.

Another art method utilized to eliminate the effects of multiples include the wave-equation method which results in a more rigorous treatment of predicting the multiple traveltimes. The wave-equation method can handle complex geometry and requires no knowledge of the velocity of the subsurface. Unfortunately, the computing cost associated with the wave-equation method has severely limited its use.

Thus there is a need in the prior art for an alternative method of processing seismic data containing multiples.

There is another need in the art for an improved method of processing seismic data containing multiples that will overcome the limitations of the art methods.

There is still another need in the prior art for an improved method of processing seismic data containing multiple noise that is not dependent upon the periodicity of the data.

There is even another need in the prior art for an improved method of processing seismic data containing multiple noise that is not dependent upon a large velocity difference between a primary event and its multiples.

There is even still another need in the prior art for an improved method of processing seismic data containing multiple noise that is not overly computationally expensive.

These and other needs of the art will become apparent to those of skill in the art upon review of this patent specification.

SUMMARY OF THE INVENTION

It is therefore one object of the present invention to provide an alternative method for processing seismic data having multiples.

It is therefore another object of the present invention to provide a method of processing seismic data having multiples that will overcome the limitations of the prior art.

It is therefore yet another object of the present invention to provide a method of processing seismic data having multiples that does not require periodicity between a primary event and its multiples.

It is therefore even another object of the present invention to provide a method of processing seismic data having multiples that is not overly computationally expensive.

It is therefore still yet another object of the present invention to provide a method of processing seismic data having multiples that does not rely upon a velocity difference between a primary event and its multiples.

These and other objects of the present invention will become apparent to those of skill in the seismic data processing art upon reading this patent specification.

According to one embodiment of the present invention there is provided a computationally simple yet unique method of isolating multiple reflection data from seismic data containing multiples, which method is preferably applied utilizing a computer. This method generally includes as a step, determining the zero-offset two-way travel time to the suspected multiple generating event. This method generally also includes as a step, creating an offset-corrected data set by the application of a normal moveout operation to the recorded seismic trace utilizing the primary event velocities. Once the normal moveout has been applied to the data, the next step includes creating a time-shifted data set by shifting all of the events in the offset-corrected data set downward in time by an amount of time equal to the zero-offset two-way travel time to the suspected multiple generating event as previously determined. Once the normal moveout operation and the two-way travel time shift have been applied to the trace, the method includes creating a multiple reflection energy data set by applying a reverse normal moveout operation to the time-shifted data set utilizing an extended velocity function, which is a function of the original primary velocity function and the interval velocity of the two-way travel time to the suspected multiple generating event. The resulting data set is now a data set containing only multiples.

According to another embodiment of the present invention there is provided a computationally simple yet unique method of processing seismic data containing multiples, which method is preferably applied utilizing a computer. This method involves subtracting a multiple reflection energy data set from the seismic data. In a preferred embodiment, the multiple reflection energy data is scaled in such a manner to minimize the subtracted multiple reflection energy data.

BRIEF DESCRIPTION OF THE DRAWINGS

FIGS. 5(a) and 5(b) are drawings which illustrate the mapping of nonzero-offset traveltime t(x) onto zero-offset traveltime t(0), with FIG. 5(a) showing the gather before normal moveout correction, and FIG. 5(b) showing the gather after normal moveout correction.

FIGS. 6(a) and 6(b) are drawings which show the application of a normal moveout correction to a traveltime curve utilizing a computer for those cases in which amplitude A at t(x) value does not necessarily fall onto an integer sample location.

FIG. 7(a) is a gather of the synthetic marine data for Example 1.

FIG. 7(b) is a gather which shows the data of FIG. 7(a) after application of normal moveout correction.

FIG. 7(c) is a gather which shows the normal moveout corrected data of FIG. 7(b) after shifting the data by the 0.2 second two-way travel time to the water bottom.

FIG. 7(d) is a gather which shows the data of FIG. 7(c) after application of a reverse normal moveout operation using the extended velocity function of FIG. 8 in the reverse NMO equation.

DETAILED DESCRIPTION OF THE INVENTION

In the practice of the method of the present invention, seismic data may be acquired by any suitable method, such as any of the numerous well known seismic exploration techniques. Generally, an acoustic wave source, such as dynamite or vibrator on land, or air gun at sea, provides acoustic waves which travel downwardly into the earth and are reflected upward from subsurface reflecting interfaces. These reflected waves are received at detectors, such as seismometers, geophones or hydrophones, which produce analog electrical seismic signals or seismic trace signals. The collected data is then generally subjected to various seismic processing techniques utilizing a computer.

The method of the present invention may be briefly explained by reference to FIG. 1 which is a schematic representation of the method of the present invention, showing primary event PE, water bottom WB, water surface WS, source S and receiver R.

Figure 1:
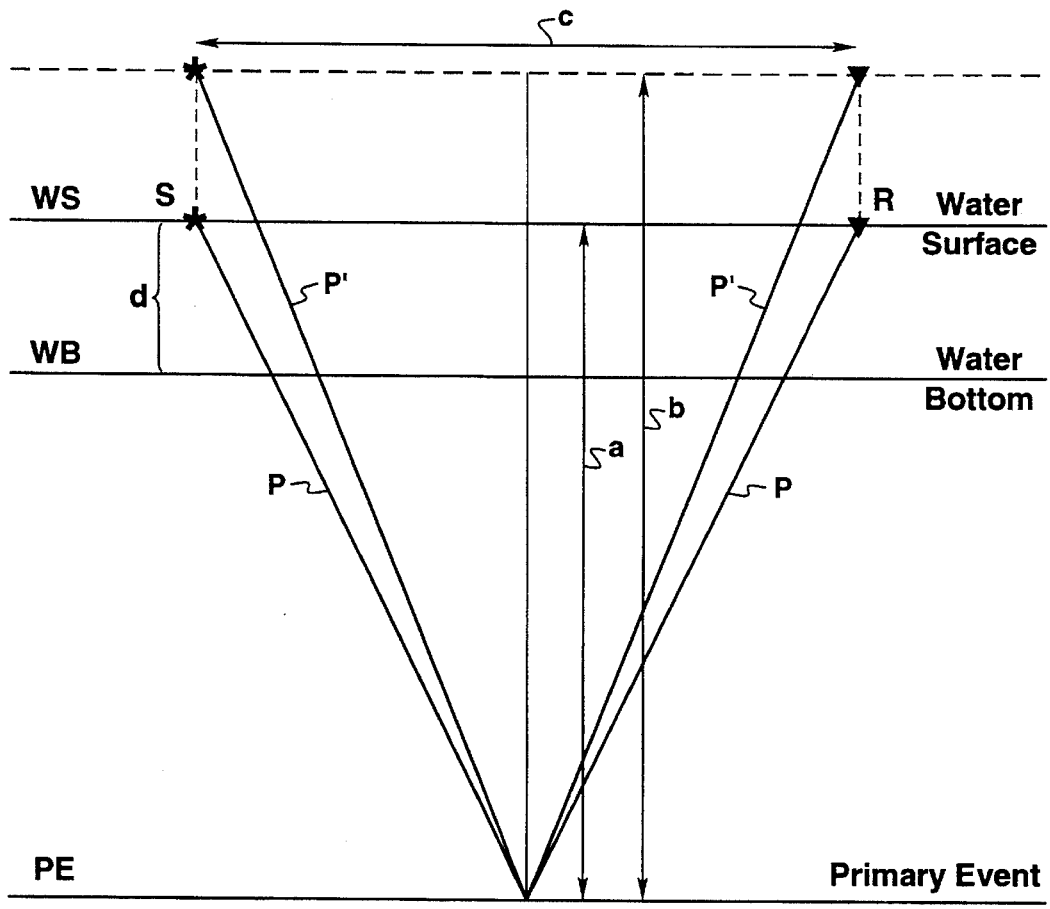
FIG. 1 is a schematic representation of the method of the present invention, showing primary event PE, water bottom WB, water surface WS, source S and receiver R.

In FIG. 1, the suspected multiple generating event is the water bottom WB. Receiver R and source S are offset by a distance c. Travel path P is the travel path from source S to primary event PE to receiver R. Label a represents a normal moveout operation where the travel path P is corrected for offset c. The travel time of the primary is now the same as if the data were gathered at zero offset. Label d is the two-way travel time from the water surface WS to the suspected multiple generating event, i.e. water bottom WB. Label b represents shifting the zero-offset travel time for path P by the two-way travel time d. A reverse normal moveout is then applied to shifted zero-offset travel time b to create path P' having offset c, which represents a predicted water bottom multiple. This predicted water bottom multiple is then subtracted from the seismic data.

In the practice of the present invention of processing seismic data containing multiples it is generally necessary to have some information concerning primary events, especially those suspected of generating any multiple reflections. Once a multiple generating primary event is identified, the method of the present invention includes as a step, determining the two-way zero-offset travel time to the suspected multiple generating event. For example, in the processing of marine seismic data, at least one of the suspected multiple generating primary events will generally be the water bottom. Thus the two-way travel time to the water-bottom will need to be determined. Such two-way travel time to a suspected multiple generating primary event may easily be determined utilizing techniques well known to those of skill in the seismic art.

The practice of the present invention will also include as a step, applying of a normal moveout operation (very commonly known as "NMO") to the recorded seismic trace utilizing the primary velocities. The normal moveout of seismic data recorded along a line of receivers is generally understood to occur because reflection arrival times vary due to varying offsets in the shotpoint-to-receiver distance. Normal moveout is a function of velocity, offset and to a lesser extent, dip, and decreases with reflection time.

In the practice of the present invention, normal moveout corrections may be applied to the data utilizing any technique known to those of skill in the art. For example, normal moveout may be applied to the seismic data as described in Seismic Data Processing by Ozdogan Yilmaz, published 1987 by Society of Exploration Geophysicists, pp. 157–162, and herein incorporated by reference.

The concept of normal moveout can be further illustrated by reference to FIG. 2 which shows for a simple case of a single horizontal layer, the geometric relationship between source S, receiver G, mid-point M, on the earth's surface with respect to a normal moveout operation.

At a given midpoint location M, the traveltime along the raypath from shot position S to depth point D, then back to receiver position G is t(x). Using the Pythagorean theorem, the traveltime equation as a function of offset is $$t^2(x) = t^2(0) + x^2/v^2,  \quad \text{(Equation 1)}$$

where x is the distance (offset) between the source and receiver positions, v is the seismic velocity of the medium above the reflecting interface, and t(0) is twice the traveltime along the vertical path MD. As shown in FIG. 2, the vertical projection of depth point D to the surface, along the normal to the reflector, coincides with midpoint M. This is the case only when the reflector is horizontal at point D. Equation 1 describes a hyperbola in the plane of two-way time versus offset with the apex being at zero offset.

Multiples are generated in multiple layer subterranean formations, the classic example being a primary event being distorted by a water-bottom multiple. Normal moveout for multiple layers is as follows.

Figure 3:
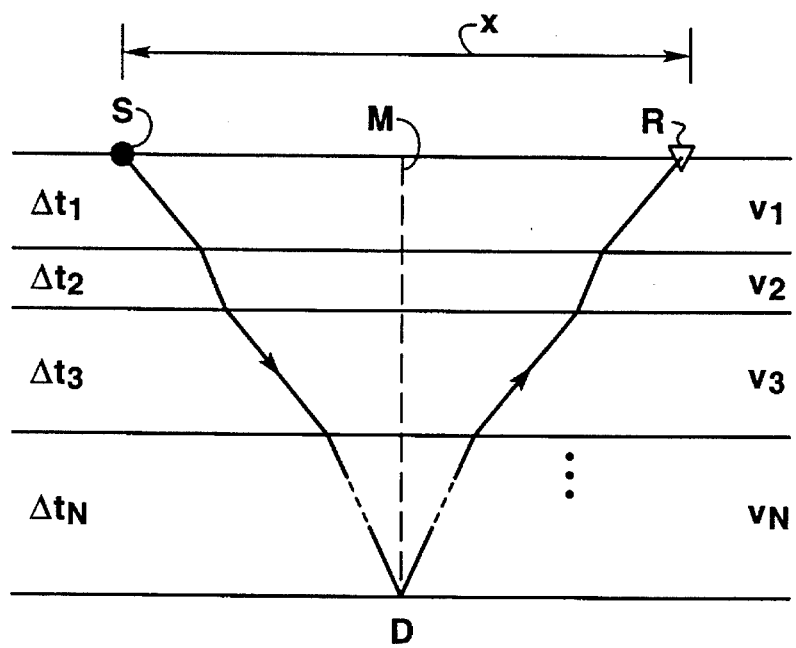
FIG. 3 is a drawing showing for multiple layers the geometric relationship between source S, receiver G, midpoint M, on the earth's surface with respect to a normal moveout operation.

FIG. 3 shows, for a subterranean composed of horizontal isovelocity layers, the geometric relationship between source S, receiver G, mid-point M, on the earth's surface with respect to a normal moveout operation. In FIG. 3, the thickness of the layers is defined in terms of two-way zero-offset time. The N layers have interval velocities $v_1$, $v_2$ ... $v_N$. The traveltime equation for a raypath from source S to depth point D, back to receiver R is known to be:

$$t^2(x) = C_0 + C_1 x^2 + C_2 x^4 + C_3 x^6 + \ldots \quad \text{(Equation 2)}$$

where $C_0 = t^2(0)$, $C_1 = 1/v_{rms}^2$, and $C_2, C_3, \ldots$ are complicated functions that depend upon layer thicknesses and interval velocities. The rms velocity $v_{rms}$ down to the reflector on which depth point D is situated is defined as $$v_{rms}^2 = \{1/t(0)\} \sum_{i=1}^{N} v_i^2 \Delta t_i(0) \quad \text{(Equation 3)}$$

where $\Delta t_i$ is the vertical two-way time through the ith layer and $$t(0) = \sum_{k=1}^{i} t_k.$$

By making the approximation that the offset is small compared to the depth, the series of Equation 3 can be truncated as follows:

$$t^2(x) = t^2(0) + x^2/v_{rms}^2 \quad \text{(Equation 4)}$$

Comparison of Equation 1 and Equation 4 shows that the velocity required for normal moveout correction for a horizontally stratified subsurface is equal to the rms velocity, for small ratios of offset to depth.

Figure 2:
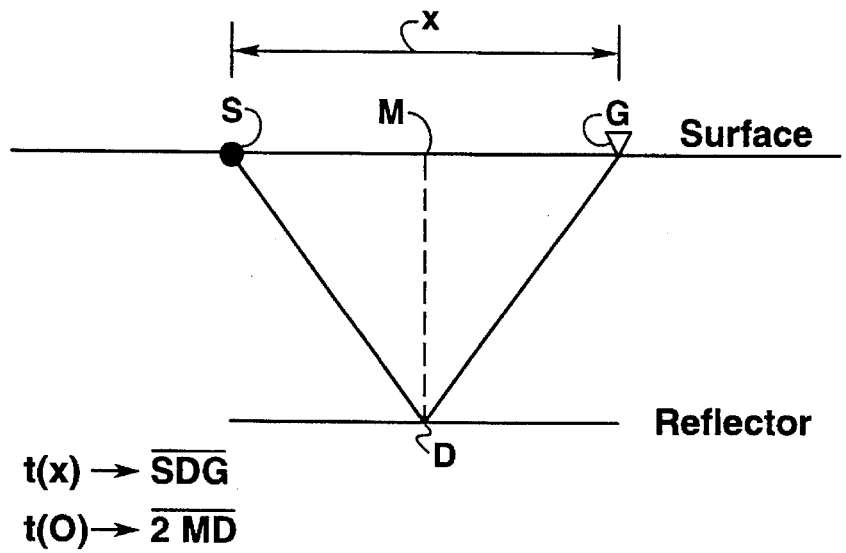
FIG. 2 is a drawing showing for a single layer the geometric relationship between source S, receiver G, midpoint M, on the earth's surface with respect to a normal moveout operation.
Figure 4:
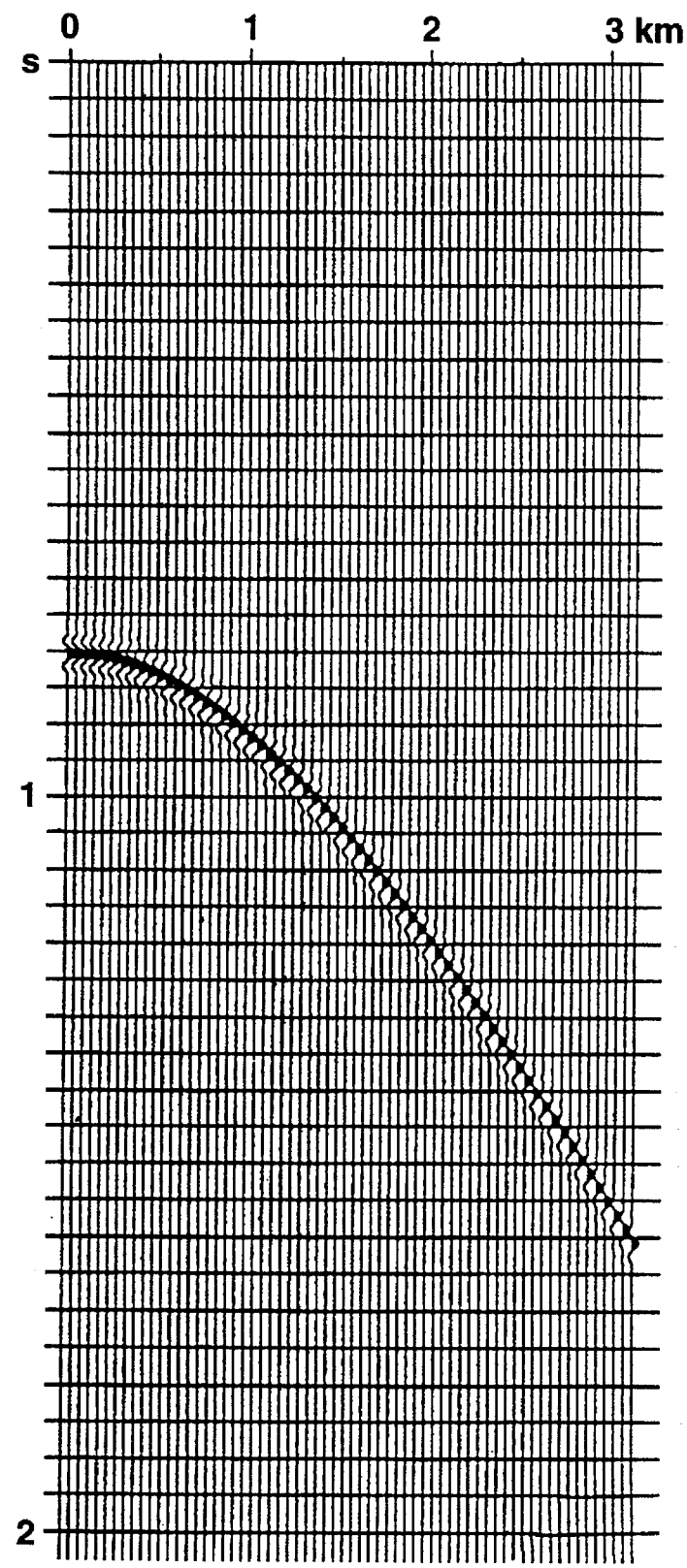
FIG. 4 is a drawing showing a synthetic common midpoint (CMP) gather associated with the geometry of FIGS. 2 or 3 in which the traveltime curve for a flat reflector is a hyperbola with its apex at the zero-offset trace.

Referring now to FIG. 4 there is shown an example of traces in a common midpoint (CMP) gather for the geometry of FIG. 2. FIG. 4 also represents a common depth point (CDP) gather, since all the raypaths associated with each source-receiver pair reflect from the same subsurface depth point D. All of the traces in this common midpoint gather contain a reflection from the same depth point. The difference between the two-way time t(x) at a given offset x and the two-way zero-offset time t(0) is called normal moveout ("NMO"). From Equation 4, the rms velocity can be computed when offset x and two-way times t(x) and t(0) are known.

Once the normal moveout velocity is estimated, the traveltimes can be corrected to remove the influence of offset. Referring now to FIGS. 5(a) and 5(b), normal moveout correction involves mapping nonzero-offset traveltime t(x) onto zero-offset traveltime t(0), with FIG. 5(a) showing the gather before normal moveout correction, and FIG. 5(b) showing the gather after normal moveout correction. Traces in the NMO-corrected gather then are summed to obtain a stack trace at the particular CMP location, as described below.

Such a normal moveout operation is most conveniently applied utilizing a computer. However, when using a computer, certain problems can arise when the time value A for the traveltime curve t(x) does not fall onto an integer location for the time value corresponding to x.

Referring now to FIGS. 6(a) and 6(b), there is shown the technique utilized to apply normal moveout correction utilizing a computer. For a given integer value t(0), velocity, and offset, t(x) is computed utilizing Equation 4. In those instances in which the time value A for the traveltime curve t(x) does not fall onto an input integer sample location for the time value corresponding to x, integer values on each side of t(x) (with integer values denoted by solid dots) are utilized to interpolate between the integer values to compute the time value at t(x). This computed time value is then mapped onto integer sample t(0) (denoted by A') at the corresponding offset. As a general rule, normal moveout increases with offset and decreases with depth.

Once the normal moveout is applied to the seismic data and the two-way travel time to the suspected multiple generating event is determined, the next step in the practice of the present invention is to shift all events in the trace downward in time by an amount of time equal to the two-way zero-offset travel time to the suspected multiple generating event.

Once the data have been shifted downward in time by the two-way zero-offset travel time to the suspected multiple generating event, a reverse normal moveout operation is applied to the trace utilizing an extended velocity function, which is a function of the original primary velocity function and the interval velocity to the suspected multiple generating event.

The reverse normal moveout is obtained by determining $t^2(x)$ from Equation 4 using an extended velocity function for the rms velocity, and time values that have been shifted by the two-way travel time to the multiple generating event.

The extended velocity function as a function of time t is as follows:

$$V_{extended}(t) = \{(V^2 t + v_m^2 t_m)/(t + t(0))\}^{1/2} \quad \text{(Equation 5)}$$

wherein $v_m$ is the velocity within the multiple generating layer, $t_m$ is the travel time within the multiple generating layer, v is the rms velocity to the primary event of interest, t(0) is the zero-offset two-way travel time to the multiple generating event.

Using the extended velocity function Equation 5 and time shifted seismic data, the following reverse normal moveout equation is obtained:

$$t^2(x) = (t(0) + t_m(x))^2 + (x^2 / V_{extended}^2(t)) \quad \text{(Equation 6)}$$

After application of the reverse normal moveout operation, a multiple trace is obtained which contains only multiples. The next step in eliminating the multiple reflection noise is to minimize the energy difference between the original trace and the multiple trace for all time depths as follows.

The energy difference E between the original trace and the multiple trace for all time depths, also referred to as the "subtracted trace energy", is shown in the following Equation 7 in which $D_i$ is the original data trace, and $M_i$ is the multiple trace, with the subscript i being the time index.

$$E^2(\alpha, \tau) = \sum_i (D_i - \alpha M_i(\tau))^2 \quad \text{(Equation 7)}$$

The method of the present invention assumes that multiples are primaries bouncing from an interface, with reflection coefficient less than unity. Therefore, the amplitude scale factor, $\alpha$, is utilized. Furthermore, a residual time shift, $\tau$, in the optimization accounts for the uncertainty in determining the two-way traveltime to the suspected multiple generating event.

For a given $\tau$, $\alpha$ is determined by setting the derivative of Equation 7 to zero and solving for $\alpha$:

$$\delta E^2 / \delta \alpha = 2 \sum_i (D_i - \alpha M_i)(-M_i) = 0 \quad \text{(Equation 8)}$$

Solving Equation 5 for $\alpha$ yields Equation 9:

$$\alpha = (\Sigma D_i M_i)/(\Sigma M_i^2) \quad \text{(Equation 9)}.$$

Once the combination of $\alpha$ and $\tau$ that minimize the subtracted trace energy E are determined, the multiple trace is subtracted from the original data trace to obtain a multiple free trace.

EXAMPLE 1

Synthetic marine data with 50 meter trace spacing was utilized for this example in which the two-way zero-offset water bottom time was 0.2 seconds, the first primary event was at 1.8 seconds, the first generated peg-leg multiple was at 2.0 seconds.

FIG. 7(a) is a gather of the input data for this example. FIG. 7(b) shows the data of FIG. 7(a) after application of normal moveout correction. FIG. 7(c) shows the data of FIG. 7(b) after shifting the data by the 0.2 second two-way travel time to the water bottom.

The extended velocity function was determined using Equation 2 above, and the interval velocity of the waterbottom time. The extended velocity function determined for this example is shown in FIG. 8.

Figure 8:
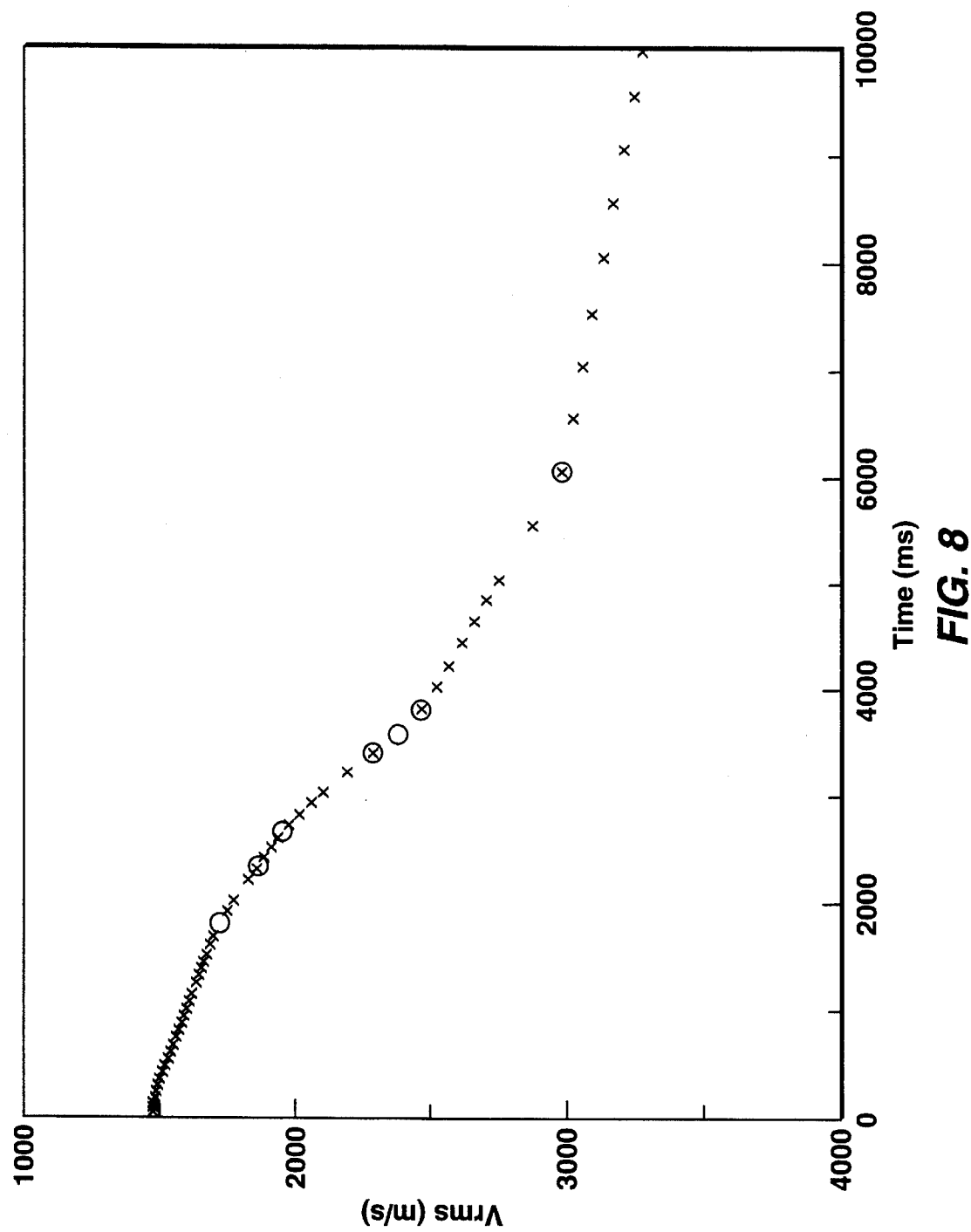
FIG. 8 is graph of the extended velocity function for the data of Example 1.

FIG. 7(d) shows the data of FIG. 7(c) after application of a reverse normal moveout operation using Equation 6 above, and the extended velocity function of FIG. 8, showing only the generated multiples.

Figures 9A, 9B, 9C, 9D, 9E:
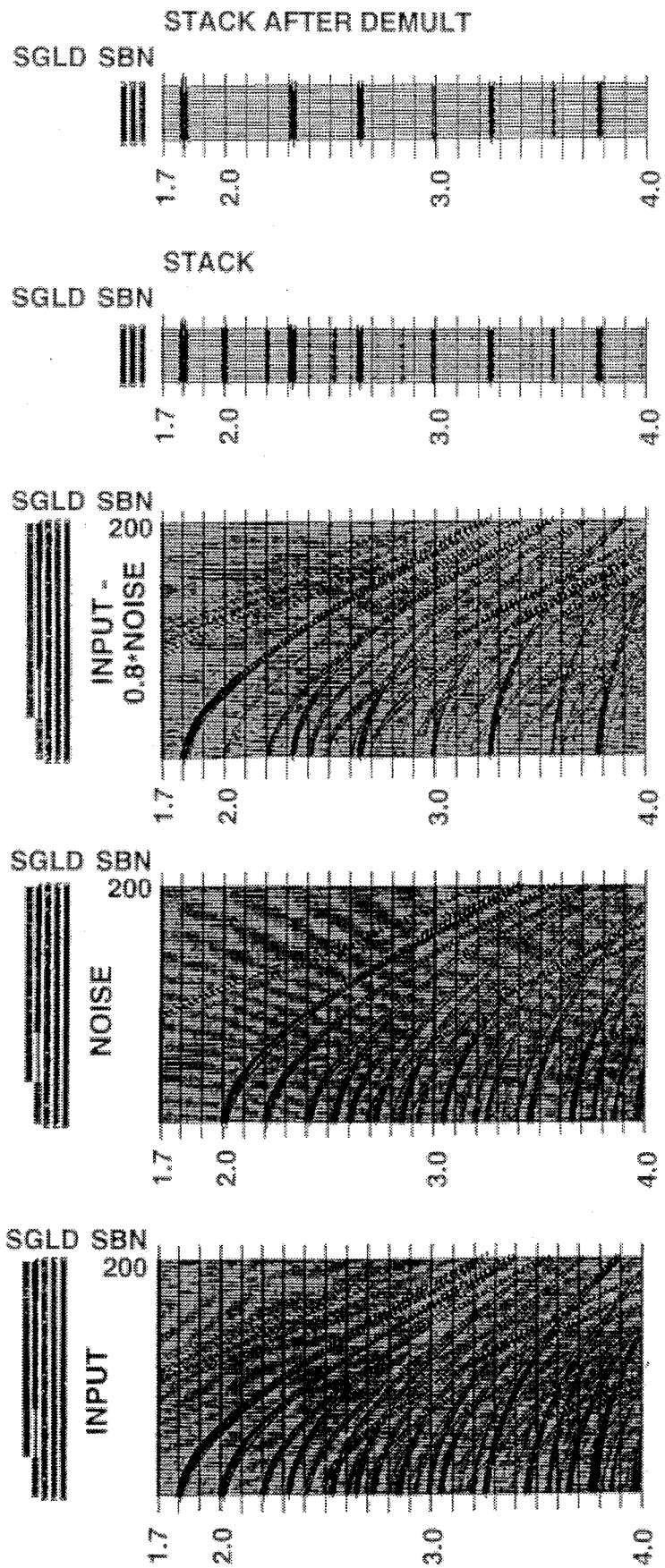
FIGS. 9(a)–9(c) are gathers which show respectively, the input data of FIG. 7(a), the noise data of FIG. 7(d), and data after application of the method of the present invention.
FIG. 9(d) is a stacked section of the trace data of FIG. 9(a) and similar data, after application of NMO and stacking.
FIG. 9(e) is a stacked section of the trace data of FIG. 9(c) and similar data, after removal of multiples by the method of the present invention.

FIGS. 9(a)–9(c) show respectively, the input data of FIG. 7(a), the noise data of FIG. 7(d), and data after application of the method of the present invention. The noise data was adjusted by the constant 0.8, which was determined by minimizing the subtracted trace energy.

FIG. 9(d) is a stacked section of the trace data of FIG. 9(a) and similar data, after application of NMO and stacking, and FIG. 9(e) is a stacked section of the trace data of FIG. 9(c) and similar data, after removal of multiples by the method of the present invention. The most notable difference between FIG. 9(d) and FIG. 9(e) is the presence of the water bottom multiple at 2.0 seconds in FIG. 9(d), and its absence in FIG. 9(e).

The description given herein is intended to illustrate the preferred embodiments of the present invention. It is possible for one of ordinary skill in the art to make various changes to the details of the present invention that are within the equivalent scope of the claimed invention, without departing from the spirit of this invention. Therefore, it is intended that all such variations be included within the scope of the present invention as claimed.

We claim:

1. A method of processing seismic data for a subsurface having a multiple generating zone bounded on at least one side by a multiple generating event, and having a primary target event, wherein the seismic data contains multiple reflection energy generated by seismic waves reflecting off of the multiple generating event and travelling within the multiple generating zone, and wherein zero-offset two-way seismic wave travel time to the multiple generating event, seismic wave velocity within the multiple generating zone, and rms seismic wave velocity to the primary event, are all known, the method comprising:

(a) creating an offset-corrected data set by applying a normal moveout operation to the seismic data utilizing the rms seismic wave velocity for the primary target event;

(b) creating a time-shifted data set by shifting all of the events in the offset-corrected data set downward in time by an amount of time equal to the zero-offset two-way travel time to the multiple generating event;

(c) creating a multiple reflection energy data set by applying a reverse normal moveout operation to the time-shifted data set of step (b) wherein the reverse normal moveout operation utilizes a velocity function which is a function of the rms seismic wave velocity for the primary target event and the seismic wave velocity within the multiple generating zone; and (d) creating a corrected data set by subtracting the multiple reflection energy data set from the seismic data.

2. The method of claim 1 wherein the velocity function, V(t), utilized in step (c) is as follows:

$$V(t) = \{(v^2 t + v_m^2 t_m)/(t + t(0))\}^{1/2}$$

wherein $v_m$ is the seismic wave velocity within the multiple generating zone, $t_m$ is the seismic wave travel time within the multiple generating zone, v is the rms velocity to the primary event of interest, and t(0) is the zero-offset travel time to the multiple generating event.

3. The method of claim 1 wherein the multiple generating zone is water, and the multiple generating event is a water bottom.

4. The method of claim 1 wherein the corrected data set of step (d) is created by subtracting the multiple reflection energy data set from the seismic data, wherein the multiple reflection energy data set is adjusted by an amplitude scaling factor and a residual time shift.

5. The method of claim 4 wherein the amplitude scaling factor and the residual time shift are selected to minimize the square of the subtracted energy between the the multiple reflection energy data set and the seismic data in the following equation $$E^2(\alpha, \tau) = \sum_i (D_i - \alpha M_i(\tau))^2$$

wherein E is the subtracted energy, $\alpha$ is the amplitude scaling factor, $\tau$ is the residual time shift, D is the seismic data, M is the multiple reflection energy data set, and i is a time index.

6. The method of claim 1 wherein the multiple generating zone is water, and the multiple generating event is a water bottom; the velocity function, V(t), utilized in step (c) is as follows:

$$V(t) = \{(v^2 t + v_m^2 t_m)/(t + t(0))\}^{1/2}$$

wherein $v_m$ is the seismic wave velocity within the multiple generating zone, $t_m$ is the seismic wave travel time within the multiple generating zone, v is the rms velocity to the primary event of interest; t(0) is the zero-offset travel time to the multiple generating event; and wherein the corrected data set of step (d) is created by subtracting the multiple reflection energy data set from the seismic data, wherein the multiple reflection energy data set is adjusted by an amplitude scaling factor and a residual time shift, with the amplitude scaling factor and the residual time shift selected to minimize the square of the subtracted energy between the multiple reflection energy data set and the seismic data in the following equation $$E^2(\alpha, \tau) = \sum_i (D_i - \alpha M_i(\tau))^2$$

wherein E is the subtracted energy, $\alpha$ is the amplitude scaling factor, $\tau$ is the residual time shift, D is the seismic data, M is the multiple reflection energy data set, and i is a time index.

7. A method of processing seismic data for a subsurface having a multiple generating zone bounded on at least one side by a multiple generating event, and having a primary target event, wherein the seismic data contains multiple reflection energy generated by seismic waves reflecting off of the multiple generating event and travelling within the multiple generating zone, the method comprising:

(a) determining zero-offset two-way seismic wave travel time to the multiple generating event, seismic wave velocity within the multiple generating zone, and rms seismic wave velocity to the primary event:

(b) creating an offset-corrected data set by applying a normal moveout operation to the seismic data utilizing the rms seismic wave velocity for the primary target event;

(c) creating a time-shifted data set by shifting all of the events in the offset-corrected data set downward in time by an amount of time equal to the zero-offset two-way travel time to the multiple generating event;

(d) creating a multiple reflection energy data set by applying a reverse normal moveout operation to the time-shifted data set of step (c) wherein the reverse normal moveout operation utilizes a velocity function which is a function of the rms seismic wave velocity for the primary target event and the seismic wave velocity within multiple generating zone; and (e) creating a corrected data set by subtracting the multiple reflection energy data set from the seismic data.

8. The method of claim 7 wherein the velocity function, V(t), utilized in step (d) is as follows:

$$V(t) = \{(v^2 t + v_m^2 t_m)/(t + t(0))\}^{1/2}$$

wherein $v_m$ is the seismic wave velocity within the multiple generating zone, $t_m$ is the seismic wave travel time within the multiple generating zone, v is the rms velocity to the primary event of interest, and t(0) is the zero-offset travel time to the multiple generating event.

9. The method of claim 7 wherein the multiple generating zone is water, and the multiple generating event is a water bottom.

10. The method of claim 7 wherein the corrected data set of step (e) is created by subtracting the multiple reflection energy data set from the seismic data, wherein the multiple reflection energy data set is adjusted by an amplitude scaling factor and a residual time shift.

11. The method of claim 10 wherein the amplitude scaling factor and the residual time shift are selected to minimize the square of the subtracted energy between the the multiple reflection energy data set and the seismic data in the following equation $$E^2(\alpha, \tau) = \sum_i (D_i - \alpha M_i(\tau))^2$$

wherein E is the subtracted energy, $\alpha$ is the amplitude scaling factor, $\tau$ is the residual time shift, D is the seismic data, M is the multiple reflection energy data set, and i is a time index.

12. A method of creating a multiple reflection energy data set for seismic data representing a subsurface having a multiple generating event, and a primary target event, wherein the seismic data contains multiple reflection energy generated by the multiple generating event, and wherein two-way zero-offset seismic energy travel time to the multiple generating event, and seismic energy velocity to the multiple generating event are known, the method comprising:

(a) creating an offset-corrected data set by applying a normal moveout operation to the seismic data utilizing a normal moveout velocity for the primary target event;

(b) creating a time-shifted data set by shifting all of the events in the offset corrected data set downward in time by an amount of time equal to the two-way zero-offset travel time to the multiple generating event; and (c) creating a multiple reflection energy data set by applying a reverse normal moveout operation to the time-shifted data set of step (b) wherein the velocity for the reverse normal moveout operation is a function of the normal moveout velocity for the primary target event and the seismic energy velocity to the multiple generating event.

13. The method of claim 12 wherein the velocity function, V(t), utilized in step (d) is as follows:

$$V(t)=\{(v^2 t+v_m^2 t_m)/(t+t(0))\}^{1/2}$$

wherein $v_m$ is the seismic wave velocity within the multiple generating zone, $t_m$ is the seismic wave travel time within the multiple generating zone, v is the rms velocity to the primary event of interest, and t(0) is the zero-offset travel time to the multiple generating event.

14. The method of claim 12 wherein the multiple generating zone is water, and the multiple generating event is a water bottom.

* * * * *